US008843749B2

(12) United States Patent
Sauve et al.

(10) Patent No.: US 8,843,749 B2
(45) Date of Patent: *Sep. 23, 2014

(54) VISUALIZATION OF TRUST IN AN ADDRESS BAR

(75) Inventors: Aaron J. Sauve, Seattle, WA (US); Cornelis K. Van Dok, Bellevue, WA (US); Marc A. Silbey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,260

(22) Filed: May 7, 2010

(65) Prior Publication Data
US 2010/0217989 A1    Aug. 26, 2010

Related U.S. Application Data

(63) Continuation of application No. 11/089,544, filed on Mar. 23, 2005, now Pat. No. 7,743,254.

(51) Int. Cl.
*H04L 9/00* (2006.01)
*H04L 9/32* (2006.01)
*H04L 29/06* (2006.01)

(52) U.S. Cl.
CPC ........... *H04L 9/3263* (2013.01); *H04L 2209/56* (2013.01); *H04L 2209/60* (2013.01); *H04L 63/126* (2013.01)
USPC ........... 713/175; 713/156; 713/168; 713/170; 713/176; 713/180; 726/2; 726/10; 726/17; 726/18; 726/19

(58) Field of Classification Search
USPC ................. 713/176, 156, 170, 175, 168, 180; 726/2, 10, 17–19; 705/44
See application file for complete search history.

(56) References Cited

U.S. PATENT DOCUMENTS

| 5,949,413 A | 9/1999 | Lerissa et al. |
| 6,018,724 A | 1/2000 | Arent |

(Continued)

FOREIGN PATENT DOCUMENTS

| EP | 1265182 | 12/2002 |
| GB | 2360921 | 10/2001 |
| WO | WO-02099689 | 12/2002 |

OTHER PUBLICATIONS http://www.opera.com/press/releases/2005/06/16.*

(Continued)

*Primary Examiner* — Kambiz Zand
*Assistant Examiner* — Tongoc Tran
(74) *Attorney, Agent, or Firm* — Andrew Sanders; Micky Minhas; Wolfe-SBMC

(57) ABSTRACT

Described are a system and method for presenting security information about a current site or communications session. Briefly stated, a browsing software is configured to receive a certificate during a negotiation of a secure session between a local device and a remote device. The certificate includes security information about a site maintained at the remote device. The security information is displayed to a user of the browsing software in a meaningful fashion to allow the user to make a trust determination about the site. Displaying the security information may include presenting a certificate summary that includes the most relevant information about the certificate, such as the name of the owner of the site and the name of the certificating authority of the certificate.

20 Claims, 7 Drawing Sheets

(56) References Cited

U.S. PATENT DOCUMENTS

| | | | |
|---|---|---|---|
| 6,247,020 B1 | 6/2001 | Minard | |
| 6,324,628 B1* | 11/2001 | Chan | 711/163 |
| 6,359,634 B1 | 3/2002 | Cragun et al. | |
| 6,433,801 B1 | 8/2002 | Moon et al. | |
| 6,456,303 B1 | 9/2002 | Walden et al. | |
| 6,489,975 B1 | 12/2002 | Patil et al. | |
| 6,801,227 B2 | 10/2004 | Bocionek et al. | |
| 6,850,913 B2 | 2/2005 | Feik | |
| 6,874,084 B1 | 3/2005 | Dobner et al. | |
| 7,024,691 B1 | 4/2006 | Herzberg et al. | |
| 7,114,177 B2 | 9/2006 | Rosenberg et al. | |
| 7,167,985 B2 | 1/2007 | Ahmed | |
| 7,320,143 B2 | 1/2008 | Le Pennec et al. | |
| 7,725,930 B2 | 5/2010 | Lawrence | |
| 7,743,254 B2 | 6/2010 | Suave | |
| 7,757,088 B2* | 7/2010 | Abdulhayoglu | 713/175 |
| 8,176,542 B2 | 5/2012 | Lawrence | |
| 8,667,573 B2 | 3/2014 | Lawrence et al. | |
| 2002/0053023 A1 | 5/2002 | Patterson et al. | |
| 2002/0124172 A1 | 9/2002 | Manahan | |
| 2002/0166049 A1 | 11/2002 | Sinn | |
| 2002/0184491 A1 | 12/2002 | Morgan et al. | |
| 2003/0007646 A1* | 1/2003 | Hurst et al. | 380/285 |
| 2003/0023878 A1 | 1/2003 | Rosenberg et al. | |
| 2003/0028762 A1 | 2/2003 | Trilli et al. | |
| 2003/0030680 A1 | 2/2003 | Cofta et al. | |
| 2003/0071849 A1 | 4/2003 | Ferri | |
| 2003/0191967 A1 | 10/2003 | Naccache | |
| 2004/0030887 A1 | 2/2004 | Harrisville-Wolff et al. | |
| 2004/0030888 A1 | 2/2004 | Roh et al. | |
| 2004/0054898 A1 | 3/2004 | Chao et al. | |
| 2004/0215649 A1 | 10/2004 | Whalen et al. | |
| 2004/0250075 A1 | 12/2004 | Anthe, II et al. | |
| 2005/0015726 A1 | 1/2005 | Tuominen | |
| 2005/0149486 A1* | 7/2005 | Nason et al. | 707/1 |
| 2005/0154889 A1 | 7/2005 | Ashley et al. | |
| 2005/0172229 A1 | 8/2005 | Reno et al. | |
| 2005/0256960 A1* | 11/2005 | Ganesh et al. | 709/229 |
| 2005/0268100 A1 | 12/2005 | Gasparini et al. | |
| 2006/0041936 A1* | 2/2006 | Anderson et al. | 726/11 |
| 2006/0053293 A1 | 3/2006 | Zager et al. | |
| 2006/0200866 A1 | 9/2006 | Cameron et al. | |
| 2006/0218403 A1 | 9/2006 | Sauve et al. | |
| 2006/0230272 A1 | 10/2006 | Lawrence et al. | |
| 2010/0211773 A1 | 8/2010 | Lawrence | |
| 2012/0222137 A1 | 8/2012 | Lawrence | |
| 2013/0332740 A1 | 12/2013 | Sauve | |

OTHER PUBLICATIONS http://www.operawiki.info/SecurityFeatures, opera 8 release date Apr. 19, 2005.*
operabeta_b1; "http://www.opera.com/docs/changelogs/windows/operabeta/", Dec. 2004.*
operabeta_b2.pdf; "http://www.opera.com/docs/changelogs/windows/800b2/", Feb. 2005.*
operabeta_b3.pdf; "http://www.opera.com/docs/changelogs/windows/800b3/", Mar. 16, 2005.*
changesincebeta3.pdf; "http://www.opera.com/docs/changelogs/windows/800/sincebeta.dml".*
opera_version_history.pdf; "http://www.opera.com/docs/history/".*
"Final Office Action", U.S. Appl. No. 11/089,544, (Mar. 17, 2009),9 pages.
"Maxthon Tabbed Browser", Retrieved from: <http://maxthon.com/> on Jan. 25, 2006, 3 pages.
"Netscape 7.1 Highlights", Retrieved from: <http://channels.netscape.com/browsers/7/learnmore/NS71$_{13}$ reviewersguide.pdf>, (2003),46 pages.
"Non-Final Office Action", U.S. Appl. No. 11/089,544, (Sep. 18, 2009),12 pages.
"Notice of Allowance", U.S. Appl. No. 11/089,544, (Feb. 17, 2010),4 pages.
"Opera for Windows", Retrieved from: <http://www.opera.com/products/desktop/> on Jan. 25, 2006, 4 pages.
"Tabbrowser Preferences—Firefox Extension", Retrieved from: <https://addons.mozilla.org/moreinfo.php?id=158 &application=firefox> on Jan. 25, 2006, 8 pages.
Herzberg, Amir et al., "Protecting (even) Naive Web Users, or: Preventing Spoofing and Establishing Credentials of Web Sites", *Bar Ilan University*, Available at <www.cs.bu.ac.il/~herzea/papers/ecommerce/trusted credentialsarea.pdf>,(Jul. 18, 2004),pp. 1-26.
Herzberg, Amir et al., "Trustbar: Protecting (even Naive) Web Users from Spoofing and Phishing attacks", *ACM Transactions on Internet Technology (TOIT)* vol. 8, Issue 4, Available at <http://u.cs.biu.ac.il/~herzbea/Papers/ecommerce/spoofing.htm>,(Sep. 2004),23 pages.
Verisign Inc., "Licensing VeriSign Certificates: Securing Multiple Web Server and Domain Configurations", *White Paper*, Available at <www.msctrustgate.com/pdf/licensing.pdf>,(Nov. 2, 2001),15 pages.
"Final Office Action", U.S. Appl. No. 11/093,527, (Mar. 4, 2009), 27 pages.
"Final Office Action", U.S. Appl. No. 12/772,616, (Nov. 25, 2011), 10 pages.
"Non-Final Office Action", U.S. Appl. No. 12/772,616, (Jul. 13, 2011), 27 pages.
"Non-Final Office Action", U.S. Appl. No. 11/093,527, (Aug. 6, 2009), 30 pages.
"Non-Final Office Action", U.S. Appl. No. 11/093,527, (Aug. 20, 2008), 25 pages.
"Notice of Allowance", U.S. Appl. No. 11/093,527, (Jan. 12, 2010), 13 pages.
"Notice of Allowance", U.S. Appl. No. 12/772,616, (Jan. 9, 2012), 7 pages.
"Opera for Windows", Retrieved from http://www.opera.com/products/desktop/ on Jan. 25, 2006, 4 pages.
"Protecting Commercial Secure Web Servers from Key-Finding Threats", *nCipher, Inc.*, Available at <www.ncipher.com/uploads/resources/pcws.pdf>,(1999), 12 pages.
"Non-Final Office Action", U.S. Appl. No. 13/465,426, (Feb. 1, 2013), 31 pages.
Honjo, et al., "Internet-Marks: The Secure Seal for WWW Site Authentication", Proceedings: In Parallel and Distributed Systems: Workshops, Seventh International Conference, Oct. 7, 2000, 6 pages.
"Why Strong Validation Processes for SSL are Essential for the Preservation of Trust in the Internet Economy", retrieved from http://ssl-ua.com/comodo_faq-russian.html on Apr. 15, 2003, (2002), 13 pages.
"Notice of Allowance", U.S. Appl. No. 13/465,426, Oct. 17, 2013, 9 pages.
"Final Office Action", U.S. Appl. No. 13/465,426, (Jul. 5, 2013), 9 pages.
"Non-Final Office Action", U.S. Appl. No. 13/965,822, Apr. 1, 2014, 11 pages.
"What is HTTPS?", Retrieved from <http://www.instantssl.com/ssl-certificate-products/https.html> on Apr. 1, 2014, 2 pages.
"Speed, Security and Simplicity: Opera 8 Web Browser Released Today", Retrieved from <http://www.operasoftware.com/press/releases/desktop/speed-security-and-simplicity-opera-8-web-browser-released-today> on Apr. 1, 2014, Apr. 19, 2005, 5 pages.
Chou, et al., "Client-side defense against web-based identity theft", Feb. 5, 2004, 16 pages.
Ye, et al., "Web Spoofing Revisited: SSL and Beyond", Feb. 1, 2002, 15 pages.
"Final Office Action", U.S. Appl. No. 13/965,822, Aug. 7, 2014, 14 pages.

* cited by examiner

VISUALIZATION OF TRUST IN AN ADDRESS BAR

CROSS REFERENCE TO RELATED APPLICATIONS

This application is a continuation of and claims priority under 35 U.S.C. §120 to U.S. patent application Ser. No. 11/089,544, filed Mar. 23, 2005, the disclosure of which is incorporated by reference herein in its entirety.

BACKGROUND

The Internet has achieved widespread acceptance with the consuming public. Today people routinely conduct business or other personal transactions using the Internet. For instance, many people to use the Internet to conduct online banking or to manage their credit card accounts. The acceptance of the Internet has led to certain malicious individuals seeking to exploit some people's lack of understanding of Internet software. For example, one scheme, known as "phishing", is used by malicious individuals to trick unwary Internet users into believing they are at a trusted site when in fact they are at the malicious individuals' site. The malicious individuals then capitalize on this misunderstanding by prompting the users for certain personal information, such as bank account numbers, credit card numbers, social security numbers, user login I.D.'s, passwords, and the like. These phishing schemes seem to be more effective than one may think.

One technique, termed Secure Sockets Layer or "SSL", is used to make a consumer's browsing experience more safe. In short, SSL is a technique for establishing trust between a remote computing system, such as an e-commerce server, and a local computing system, such as the consumer's computer. The entity that controls the remote computing system obtains an "SSL certificate" from a Certificating or Certifying Authority ("CA"). The CA is a highly trusted organization that assumes the responsibility of verifying the identify of entities or individuals that request a certificate, and then issuing the certificates to them. The SSL certificate is essentially an electronic document, digitally signed by the CA, that is un-modifiable and affirmatively associates a particular domain with a particular entity.

When the local computing system initiates a session with the remote computing system (which is inside the certified domain), the remote computing system returns the SSL certificate to the local computing system. The local computing system determines from the SSL certificate the identity of the CA that signed it. The local computing system then uses a locally-stored version of the CA's root certificate to verify the integrity of the remote computer's SSL certificate. If the remote computer's SSL certificate is valid and in-date, the local computer negotiates an encrypted session with the now-validated remote computing system. This encrypted session may be used to safely conduct sensitive transactions, such as online banking or e-commerce.

It should be apparent that the authenticity, validity, and even existence of the particular SSL certificate is of paramount importance to the value of the SSL protocol. However, most users are completely unaware that such a certificate even exists during an SSL session. Some browsing software may present a small icon or the like to indicate little more than the fact that a secure SSL session has been started. But importantly, few users know how to evaluate the information contained in the certificate because conventional technologies hide the certificate in the background and only use it to set up the secure session.

An adequate mechanism for conveying to a user the legitimacy of a session with a Web site has eluded those skilled in the art, until now.

SUMMARY

The present disclosure is directed at techniques and mechanisms that implement a system for presenting security information about a current site or communications session. Briefly stated, a browsing software is configured to receive a certificate during a negotiation of a secure session between a local device and a remote device. The certificate includes security information about a site maintained at the remote device. The security information is displayed to a user of the browsing software in a meaningful fashion to allow the user to make a trust determination about the site. Displaying the security information may include presenting a certificate summary that includes the most relevant information about the certificate, such as the name of the owner of the site and the name of the certificating authority of the certificate.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

The following description is directed at a system and method for a meaningful presentation of security-related information about a current browsing session. Generally stated, a graphical interface in browsing software is configured to display an address of a current site or page with the domain of the address highlighted. Specific implementations of this general concept will now be described.

Figure 1:
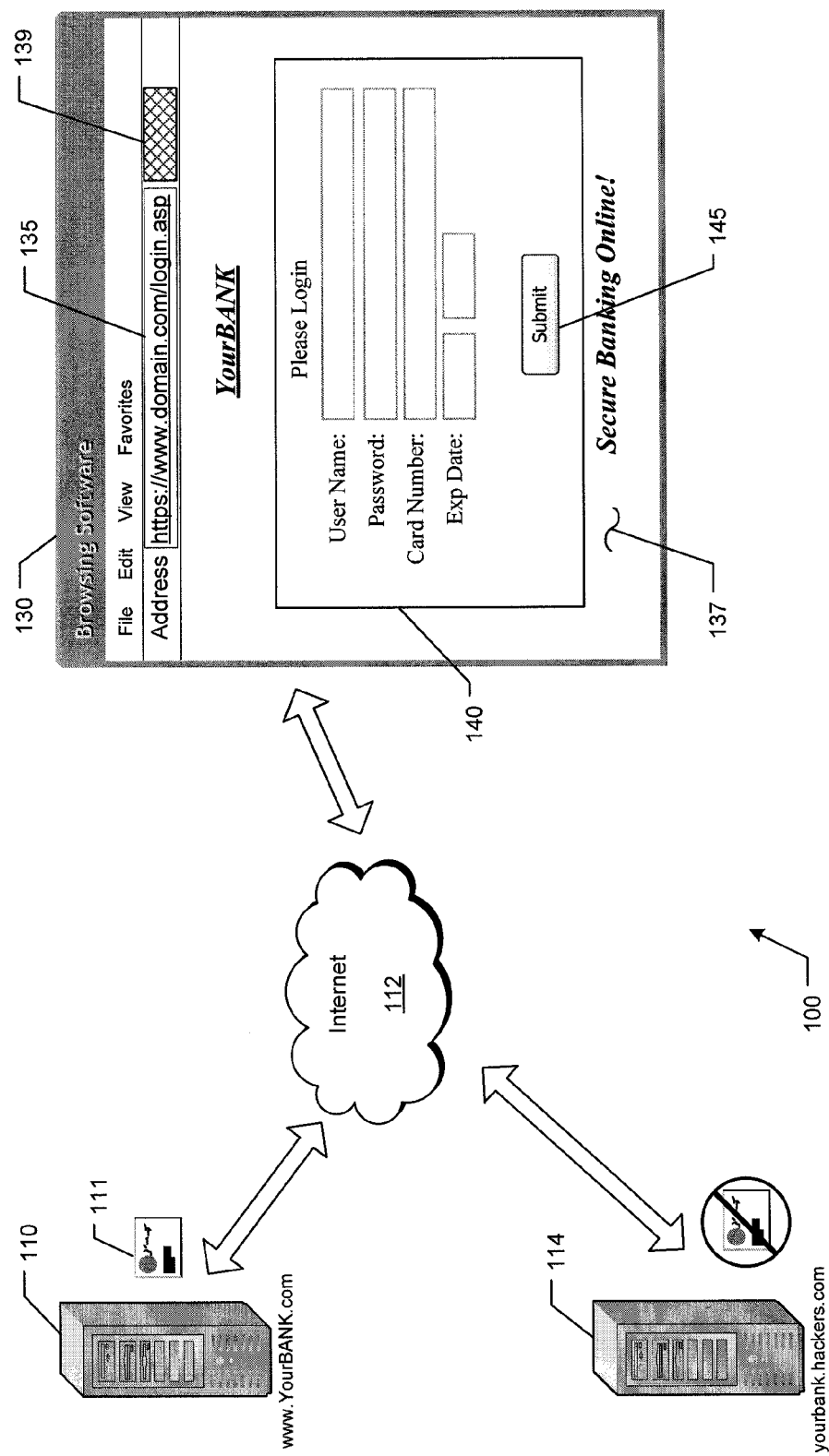
FIG. 1 is a functional block diagram generally illustrating a system for retrieving content from a remote location to browsing software, in accordance with one or more embodiments.

FIG. 1 is a functional block diagram generally illustrating a system 100 for performing transactions or otherwise retrieving information over the Internet 112. Included in the system 100 are a graphical display produced by browsing software 130 executing on a client computing system (not shown), a "legitimate" server 110, and an "illegitimate" server 114. Each of these elements is connected over a wide area network, such as the Internet 112.

The legitimate site 110 is a computing system associated with a legitimate entity or business, such as a bank's online access, an electronic retailer, or the like. In this example, the legitimate entity is located at the domain "yourbank.com". The legitimate site 110 supports SSL connections (e.g., the "https" protocol), so the entity that maintains the legitimate site 110 has obtained an SSL certificate 111 from a Certificating Authority ("CA") (not shown) confirming that the domain "yourbank.com" is under the control of the entity. As is known in the art, the certificate 111 is an electronic document, digitally signed by the CA, that includes the entity's public key and information that confirms the identity of the entity and the association of the entity with that particular domain.

The illegitimate site 114 is a computing device under control of some malicious or untoward entity controlled by individuals that intend to deceive people into believing that the illegitimate site 114 is in fact the legitimate site 110. In this example, the illegitimate site 114 resides at the domain "hackers.com". In this example, the illegitimate site 114 is not confirmed by an SSL certificate, although it could be.

It should be noted that the domains "yourbank.com" and "hackers.com" are used here as examples only and are intended to represent the general concepts of a legitimate site and an illegitimate site for simplicity of discussion only. Neither the inventors nor the assignee of this patent document intend any importance to those particular domains or their respective owners, should there actually be any.

A user uses the browsing software 130 to visit (or "surf") various locations on the Internet 112, such as the legitimate site 110. In one example, the legitimate location 110 may be the online access for the user's bank. When the browsing software 130 initiates the session with the legitimate site 110, the two computing devices negotiate an SSL connection and the legitimate site 110 transmits the certificate 111 to the browsing software 130. Once the browsing software 130 validates the certificate 111, a secure (e.g., encrypted) session is established.

The resulting web page 137 (retrieved from the legitimate site 110) displays various elements used to conduct an electronic commercial transaction. For example, the web page 137 may include information that purports to identify the entity that is conducting business using the legitimate site 110, "YourBANK" in this example. A frame 140 on the web page 137 includes fields that prompt the user to enter personal identifying information, such as a username and password, credit card number and expiration, bank account number, PIN number, social security number, or the like. A submit button 145 serves to post the form data from the fields back to the site hosting the web page 137 (the legitimate site 110 in this example). Using conventional technology, any one or more of those elements (e.g., the web page 137, the frame 140, or the form button 145) could negotiate an SSL session (or "subsession") to retrieve or post certain content over a secure link. However, conventional technologies do not communicate such SSL sub-sessions to the user in any fashion.

A common feature of browsing software generally is the ability to view, in the address bar 135, a URL or Universal Resource Identifier (URI) that identifies the particular location of the content currently being rendered by the browsing software 130. However, with conventional technologies, the URL may be obscured with too many various elements, such a protocol identifier, a domain name (including three or more levels of domain), any script names, parameters that are being passed to those scripts, and the like. Thus, the user may not easily be able to determine that the site currently being viewed is not actually within the expected domain for the web page 137. For example, the user may have clicked a link in an e-mail message believing it would lead to a site maintained by the legitimate site 110 (e.g., within the domain "yourbank.com"). However, the link may have actually led to a site maintained at the illegitimate site 114 that was created to look similar to the legitimate site 110, a technique called "spoofing" the site. In this way, the user can be fooled into providing the personal information 140 to the illegitimate site 114.

Figure 3:
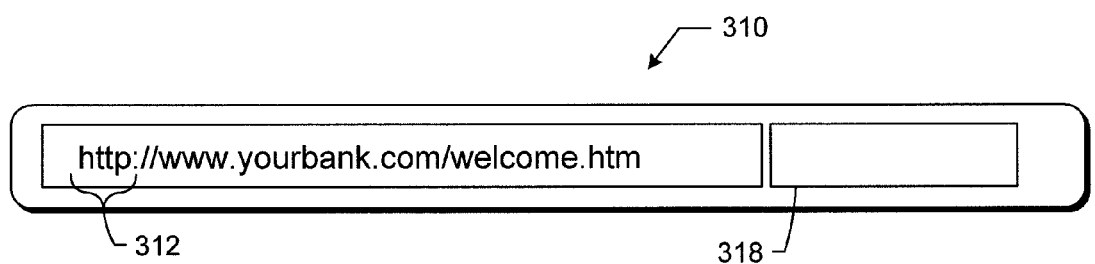
FIGS. 3 through 6 are general representations of an address bar displayed by browsing software that includes security information about a current session.

In one or more embodiments, a portion of the graphical display of the browsing software 130 is used to convey security information to help the user determine what level of trust to attach to the currently-displayed web page 137. More specifically, an "SSL bar" 139 is displayed next to an address bar 135 that visually portrays security information about the security level and details of the current session (e.g., the web page 137 at the URL in the address bar 135). There are many possible ways to emphasize security with the SSL bar 139, in particular regarding the display of certificate information. Some options are discussed below in conjunction with FIG. 3. Briefly stated, the SSL bar 139 is used to display important security information about the current session or about the current web page 137. For instance, if the user of the browsing software 130 had inadvertently been directed to the illegitimate site 114, which was spoofing the legitimate site 110, the SSL bar 139 would visually convey information about the current session that would hopefully allow the user to determine that the web page 137 was not actually from the legitimate site 110.

Figure 2:
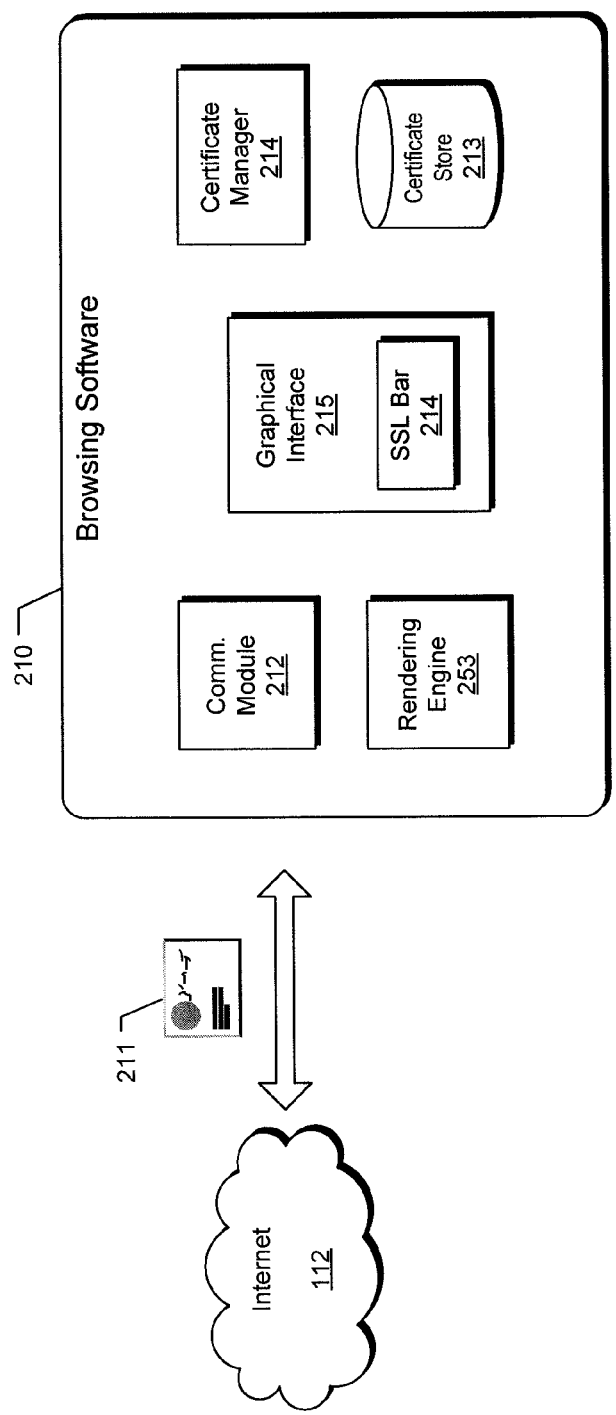
FIG. 2 is a functional block diagram illustrating components of browsing software that implement one or more embodiments.

FIG. 2 is a functional block diagram illustrating software components of browsing software 210 that are configured in accordance with one or more emodiments. The browsing software 210 may be any software components or modules that support the retrieval and viewing of content from a wide area network, such as the Internet, using the TCP/IP protocol. The browsing software 210 may be implemented as functionality or modules of code in an operating system, or it may be implemented as a standalone application, or some combination of the two.

In this implementation, the browsing software 210 includes a rendering engine 253 that is configured to render content commonly used by Internet programmers. For instance, the rendering engine 253 may be configured to interpret HyperText Markup Language (HTML) and eXtensible HTML (XHTML) and render Web pages created in those, and many other, markup languages and retrieved over the Internet 112. Rendering content from Internet sites is well known in the art.

The browsing software 210 may also either include or interact with communications module 212, which is responsible for establishing a communications link with other devices over the Internet 112. As part of establishing that link, an SSL certificate 211 may be delivered to the browsing software 210 from a remote device within some domain. As mentioned above, the SSL certificate 211 definitively identifies the entity that owns or at least controls the domain. Other functionality of the communications module 212 may include negotiating an SSL session between the browsing software 210 and the remote device, and encrypting/decrypting content transmitted over that secure link.

A certificate manager 214 may receive and verify certificates received by the communications module 212, such as certificate 211. A certificate store 213 may contain root certificates for particular trusted Certificating Authorities (CAs) that are used to verify inbound SSL certificates, such as certificate 211. It will be appreciated that the certificate store 213 may be pre-populated with root certificates for highly trusted CAs by the creator of the browsing software 210. Additional root certificates may also be added to the certificate store 213 over time. The certificate manager 214 may be configured to examine the SSL certificate 211 to determine the particular CA that signed the certificate, and to search the certificate store 213 for a root certificate from that CA. The certificate manager 214 may examine an entire chain of certificates until determining the appropriate root certificate for the CA, as is known in the art.

The certificate manager 214 is also configured to make information about the certificate 211 available to other components of the browsing software 210, such as the graphical interface 215. That information may include anything discovered by the certificate manager 214 during the examination or verification of the certificate 211.

The graphical interface 215 is configured to create a visual display of the content currently being rendered by the rendering engine 253. In addition, the graphical interface 215 is configured to display certain information about the content, such as an SSL bar 214 that displays security-related information about the content. In this particular implementation, the SSL bar 214 is configured to render a visual element in the browser display that summarizes or conveys, in a simple and usable fashion, the information made available by the certificate manager 214. As is described in greater detail below, the SSL bar 214 may present a visual representation of the degree of trust associated with the current content. For instance, the SSL bar 214 may present a visual element indicating that a secure SSL connection has been established, that a valid and current certificate has been presented, and identifying information found in that certificate. Likewise, the SSL bar 214 may present a visual element indicating that the certificate 211 is invalid or has expired, or is otherwise faulty.

FIGS. 3 through 6 are general representations of an address bar displayed by browsing software that includes security information about a current session. Beginning with FIG. 3, an address bar 310 is shown that may be presented by browsing software while a user is browsing sites on the Internet, or any other wide or local area network. In this example, the browsing software is currently displaying resources associated with a location that is not using security measures. This is suggested because the protocol portion 312 indicates that the "HTTP" protocol rather than the "HTTPS" protocol is being used to communicate with the remote location. Thus, in this example, the SSL bar 318 does not present any information to indicate that a heightened security session is in place. In other words, during a session in which there is no expectation of security, the SSL bar 318 is presented as a neutral indicator (perhaps no color or neutral color), if shown at all. The neutral indicator may also be displayed in the mixed content condition (e.g., a frame on the page is using SSL but the page itself is not, or vice versa).

Figure 4:
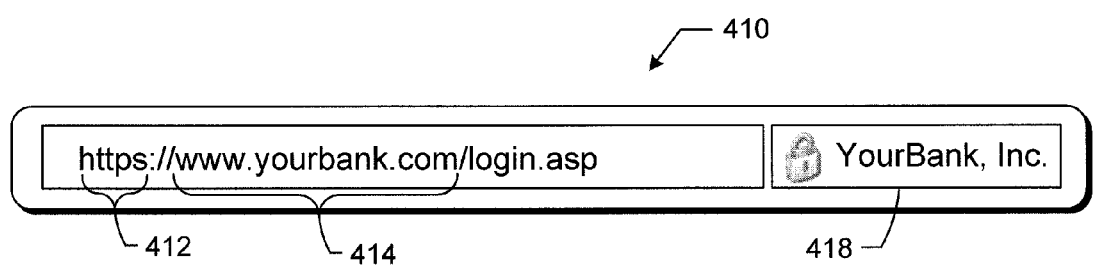

Turning now to FIG. 4, the user has navigated or otherwise arrived at a secure location, suggested by the protocol portion 412 of the URL indicating that the "HTTPS" protocol is in use (i.e., an SSL secure link). Because SSL is being used, the browsing software has been presented with an SSL certificate by the remote device (i.e., the device at the URL domain 414). Accordingly, the SSL bar 418 is this example may be displayed in a certain color to draw the attention of the user to the current level of trust. In this example, the SSL certificate was validated and a secure session established. Thus, the SSL bar 418 may be shown in "green" or some other color to indicate that the current session is secure.

In addition, the SSL bar 418 may display other information from the SSL certificate to help the user evaluate how trustworthy the current site is. For example, the SSL bar 418 may display the name of the company that has been verified (from the certificate) to control the site. Other information from the certificate could be displayed, but typically the certified owner or controller of the site is the most relevant information. In a further enhancement, the SSL bar 418 may be configured to respond to user actions, such as hovering over or clicking the SSL bar 418. Such actions may result in the user being presented with an expanded summary of the active certificate, or perhaps may result in the user being prompted to click the SSL bar 418 to see the certificate (in the case of a hover).

Figure 5:
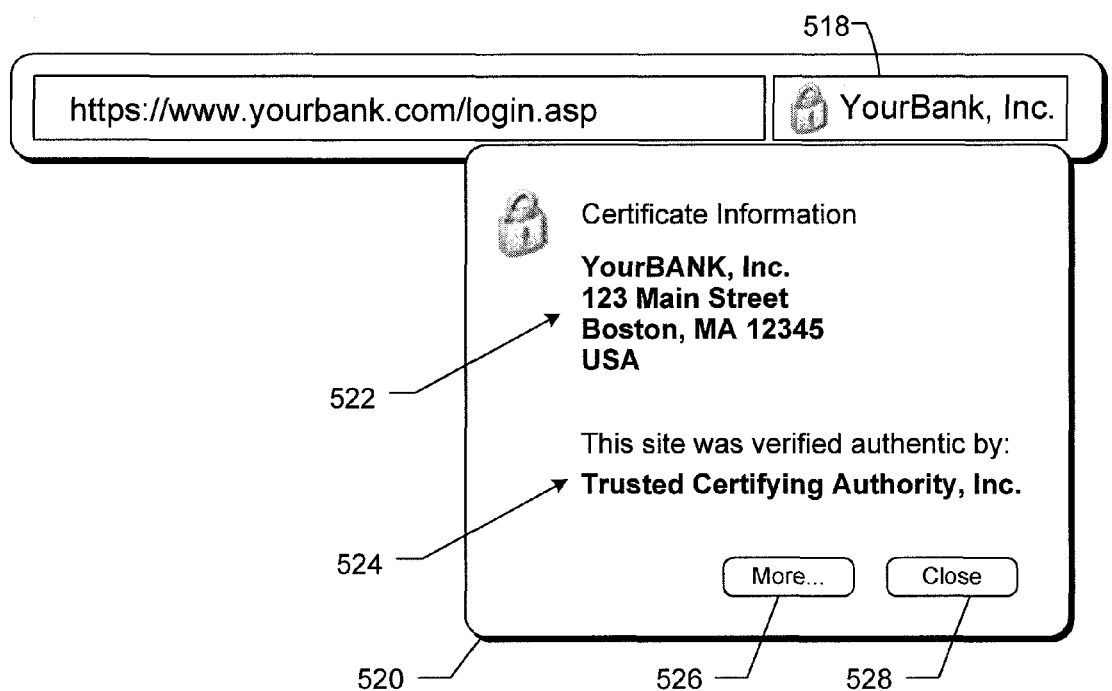

Turning now to FIG. 5, if the user clicks the SSL bar 518, a certificate summary 520 is dropped down from the SSL bar 518 to present the user with the most security-relevant information about the current site. This information is derived from the SSL certificate associated with the current site. The certificate summary 520 may be displayed in an area very near the address bar to help prevent spoofing by some elements of the web page being displayed, such as a "Flash pop-up" or the like.

The information displayed on the certificate summary 520 may include any security-related information, but in this implementation the display is limited to only the most important information. For instance, the existence of the certificate summary 520, most importantly, indicates to the user that the certificate is valid. In addition, identifying information about the owner 522 of the certificate is shown, such as the owner's company name or individual name (if appropriate), the owner's address and country of origin, may also display a company logo. The certificate summary 520 may also show the name and location of the CA that signed the certificate, and may additionally display the CA's logo if applicable. In one enhancement, hyperlinks could be included from the owner's information 522 to the owner's home page and/or from the CA's information 524 to the CA's home page. A "more" button 526 may result in displaying a dialog that presents the complete information from the current SSL certificate, and a "close" button 528 closes the certificate summary 520.

Figure 6:
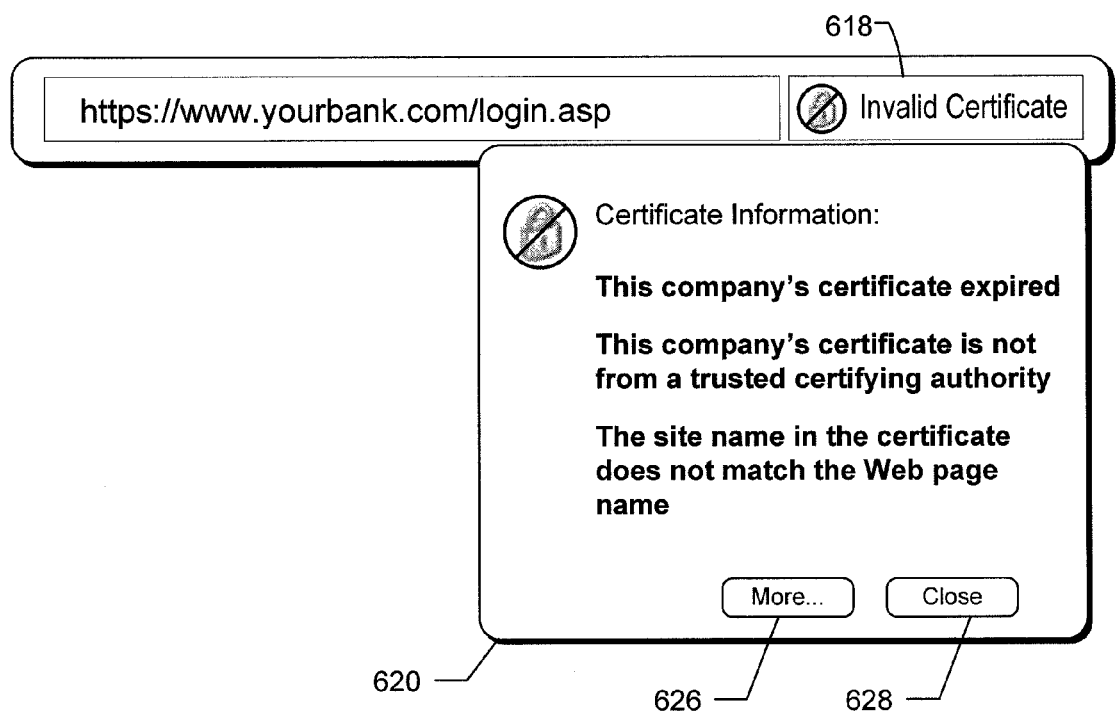

Turning now to FIG. 6, in some cases, the current session may be an SSL session, but there may be some infirmity in the certificate. Browsing software may not be able to validate an SSL certificate for many reasons, for example the certificate may have expired, the CA of the certificate may not be trusted by the browsing software (e.g., there is not a locally-stored root certificate for that particular CA), the name on the certificate does not match the name of the site, or the certificate may have been revoked. In these or any other circumstances where a certificate fails validation, the SSL bar 618 may be displayed in a color different from the safe color, such as yellow or perhaps red. In addition, the SSL bar 618 may textually indicate that the certificate is invalid and with a warning icon.

If the certificate is deemed faulty, an invalid certificate summary 620 may be automatically displayed to the user. The invalid certificate summary 620 is similar to the valid certificate summary 520 described above, except that the reason for the failure to validate the certificate is displayed, such as because the certificate has expired, is not from a trusted certifying authority, or the site name in the certificate does not match the Web page name. A warning (not shown) could also be displayed, such as: "Warning: Do not enter information into this Web page unless you trust it and the company securing it." As with the valid certificate summary 520 described above, the invalid certificate summary 620 may include a "more" button 626 to display a dialog that presents the complete information from the current SSL certificate, and a "close" button 628 to close the invalid certificate summary 620.

Note that in the examples shown in FIGS. 3 through 6, the SSL bar is located immediately next to the URL of the currently-displayed site. This location improves the likelihood that it will be seen by the user.

Figure 7:
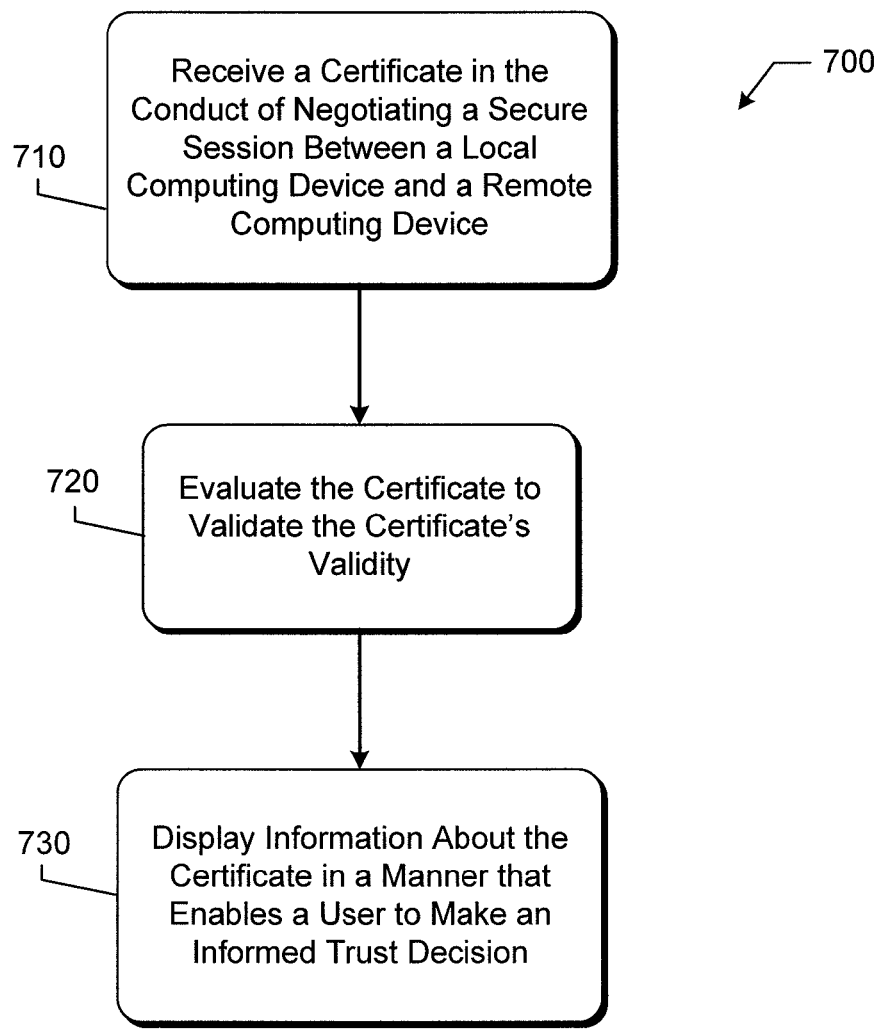
FIG. 7 is an operational flow diagram generally illustrating a process for presenting security-related information in a browser display.

FIG. 7 is an operational flow diagram generally illustrating a process 700 for presenting security-related information in a browser display. The process 700 may be implemented on a computing device on which resides and executes browsing software for accessing locations on a wide area network, such as the Internet. The process 700 begins at step 710 where browsing software negotiates a secure communications session with a remote device, and receives a certificate that attests to the validity of the remote device.

At step 720, the certificate received at step 710 is evaluated to determine its validity. The certificate may be evaluated in one or more of very many different ways. For example, the signing of the certificate may be confirmed with a local root certificate for the certifying authority, evaluating the expiration date of the certificate, comparing site information in the certificate to the current session, determining whether the certificate has been revoked, and the like. Evaluating the certificate includes retrieving descriptive information from the certificate.

At step 730, certain relevant information about the certificate is displayed to enable a user to make a trust decision concerning the current session. More specifically, an SSL bar may be presented in the browser display to indicate a security level associated with the certificate. Displaying the SSL bar may include presenting information in the SSL bar to convey the current level of security, such as the identity of the owner of the certificate and whether the certificate is valid. In addition, displaying the SSL bar may include presenting a certificate summary that includes highly relevant security information from the certificate, such as the owner of the current site and the certificating authority. In addition, the certificate summary may indicate that the certificate is invalid for some reason or that the certificating authority is not trusted on the local device. The certificate summary also includes a link or other mechanism that allows the user to retrieve additional or complete information about the certificate. In this way, the user can visually and easily make a determination about whether to trust the current site.

Although the above process is illustrated and described sequentially, in other embodiments, the operations described in the steps may be performed in different orders, multiple times, and/or in parallel.

Illustrative Operating Environment

The various embodiments described above may be implemented in general computing systems adapted as either servers or clients. An example computer environment suitable for use in one or more embodiments is described below in conjunction with FIG. 8.

Illustrative Computing Environment

Figure 8:
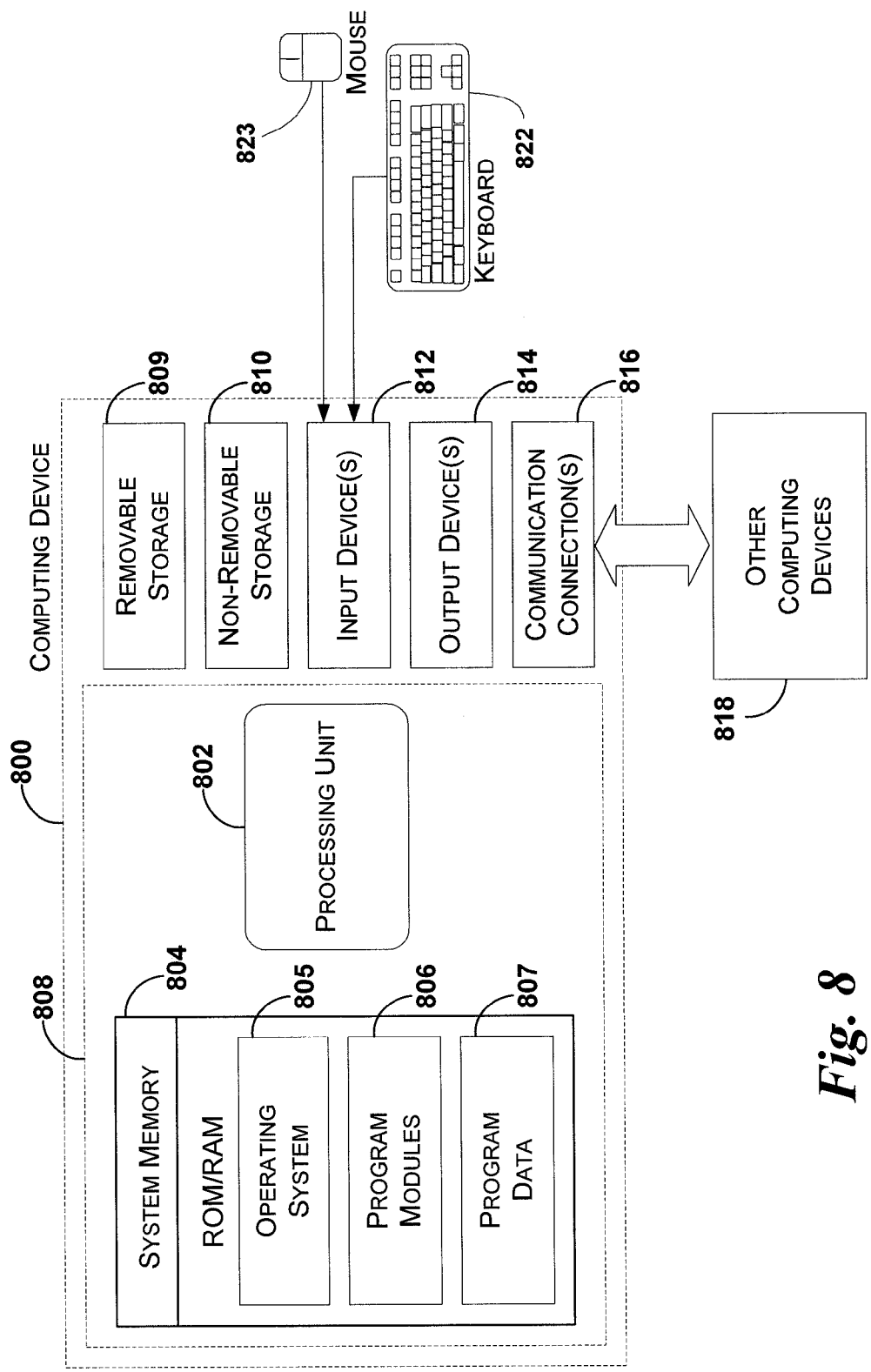
FIG. 8 is a functional block diagram illustrating a sample computing device that may be used in various implementations of the described techniques.

FIG. 8 illustrates a sample computing device that may be used to implement the techniques described herein. With reference to FIG. 8, an example system includes a computing device, such as computing device 800. In a very basic configuration, computing device 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 805, one or more program modules 806, and may include program data 807. This basic configuration of computing device 800 is illustrated in FIG. 8 by those components within dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard 822, mouse 823, pen, voice input device, touch input device, scanner, etc. Output device(s) 814 such as a display, speakers, printer, etc. may also be included. These devices are well known in the art and need not be discussed at length here.

Computing device 800 may also contain communication connections 816 that allow the device to communicate with other computing devices 818, such as over a network. Communication connections 816 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

While example embodiments and applications have been illustrated and described, it is to be understood that the describe techniques are not limited to the precise configuration and resources described above. Various modifications, changes, and variations apparent to those skilled in the art may be made in the arrangement, operation, and details of the methods and systems disclosed herein without departing from the scope of the claimed subject matter.

What is claimed is:

1. A system comprising:
    one or more processors;
    one or more computer-readable storage media storing instructions that, when executed via the one or more processors, cause the one or more processors to implement a browser configured to:
        output a webpage in a display portion of the browser responsive to navigation of the browser to the webpage;
        display a visual representation of a level of trust established for the webpage via an address bar of the browser, the address bar incorporating a protocol portion to present a uniform resource locator (URL) corresponding to the webpage and a security bar portion to present the visual representation of the level of trust in conjunction with the URL.

2. The system recited in claim 1, wherein the browser is further configured to enable navigation to obtain the webpage from a website over a network.

3. The system recited in claim 2, wherein the browser is further configured to:
receive an assertion of trust corresponding to the webpage via the website responsive to navigation to obtain the webpage; and
establish the level of trust based on the assertion of trust that is received.

4. The system recited in claim 2, wherein the browser is further configured to establish the level of trust based upon a certificate that is presented by the website responsive to navigation of the browser to obtain the webpage.

5. The system recited in claim 1, wherein the visual representation comprises an icon indicative of the level of trust.

6. The system recited in claim 1, wherein the visual representation comprises a color indicative of the level of trust.

7. The system recited in claim 1, wherein the visual representation comprises a name of a trusted entity associated with the webpage.

8. The system recited in claim 1, wherein the visual representation comprises one or more of an icon, a color, or a name of an entity associated with the webpage.

9. The system recited in claim 1, wherein to display the visual representation of the level of trust comprises coloring at least the security bar portion of the address bar to indicate the level of trust.

10. The system recited in claim 1, wherein to display the visual representation of the level of trust comprises coloring both the protocol portion and the security bar portion to indicate the level of trust.

11. The system recited in claim 1, wherein the browser security bar portion incorporated with the address bar is further configured to respond to one or more user actions to cause an expanded summary of security information to appear proximate to the security bar portion.

12. A computer-implemented method comprising:
rendering content in a display portion of a browser responsive to navigation of the browser to a uniform resource locator (URL) to obtain the content; and
displaying a visual representation of a level of trust established for the content via an address bar of the browser based upon an assertion of trust corresponding to the URL, the address bar incorporating a protocol portion to present the URL corresponding to the content and a security bar portion to present the visual representation of the level of trust in conjunction with the URL.

13. The computer-implemented method recited in claim 12, further comprising:
detecting a user action to interact with the security bar portion; and
responsive to the user action, exposing a security summary portion of the address bar that is configured to include expanded security related information regarding the content.

14. The computer-implemented method recited in claim 12, further comprising:
receiving the assertion of trust as a certificate that corresponds to the content responsive to navigation to the URL; and
establishing the level of trust based on the certificate.

15. The computer-implemented method recited in claim 14, wherein the certificate comprises a secure socket layer (SSL) certificate.

16. The computer-implemented method recited in claim 10, wherein the visual representation of the level of trust comprises one or more of an icon, a color, or a name of an entity associated with the URL.

17. The computer-implemented method recited in claim 10, wherein displaying the visual representation of the level of trust comprises coloring at least the security bar portion of the address bar to indicate the level of trust.

18. One or more computer readable storage media storing instructions that, when executed by one or more devices of a computing system, cause the computing system to perform acts including:
outputting a webpage in a display portion of a browser responsive to navigation of the browser to the webpage;
receiving an assertion of trust corresponding to the webpage responsive to the navigation;
establishing a level of trust for the webpage based on the assertion of trust that is received; and
displaying a visual representation of the level of trust established for the webpage via an address bar of the browser, the address bar incorporating a protocol portion to present a uniform resource locator (URL) corresponding to the webpage and a security bar portion to present the visual representation of the level of trust in conjunction with the URL, the visual representation including at least coloring the security bar portion of the address bar to indicate the level of trust.

19. One or more computer-readable storage media as recited in claim 18, wherein coloring the security bar portion of the address bar to indicate the level of trust comprises:
coloring the security bar portion in a first color when the assertion of trust is determined to be valid; and
coloring the security bar portion in a second color when the assertion of trust is determined to be invalid.

20. One or more computer-readable storage media as recited in claim 18, wherein the instructions, when executed by the one or more devices of the computing system, further cause the computing system to perform acts including:
detecting a user action to interact with the security bar portion; and
responsive to the user action, exposing a security summary portion of the address bar that is configured to include expanded security related information regarding the webpage.

* * * * *